(12) United States Patent
Sheik-Nainar et al.

(10) Patent No.: US 9,870,080 B2
(45) Date of Patent: Jan. 16, 2018

(54) METHOD, SYSTEM, AND DEVICE FOR CONTROLLING A CURSOR OR USER INTERFACE ACTION AS A FUNCTION OF TOUCH AND FORCE INPUT

(71) Applicant: Synaptics Incorporated, San Jose, CA (US)

(72) Inventors: Mohamed Ashraf Sheik-Nainar, San Jose, CA (US); Daniel L. Odell, San Jose, CA (US); Eric Faggin, San Jose, CA (US); Kipling Inscore, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 187 days.

(21) Appl. No.: 14/858,686

(22) Filed: Sep. 18, 2015

(65) Prior Publication Data

US 2017/0083135 A1   Mar. 23, 2017

(51) Int. Cl.
*G06F 3/041*   (2006.01)

(52) U.S. Cl.
CPC .. *G06F 3/0412* (2013.01); *G06F 2203/04104* (2013.01); *G06F 2203/04105* (2013.01)

(58) Field of Classification Search
CPC ......... G06F 3/0412; G06F 2203/04104; G06F 2203/04105
See application file for complete search history.

(56) References Cited

U.S. PATENT DOCUMENTS

| 6,034,672 | A | 3/2000 | Gaultier et al. |
| 6,388,655 | B1 | 5/2002 | Leung |
| 7,952,566 | B2 | 5/2011 | Poupyrev et al. |
| 8,344,883 | B2 | 1/2013 | Ujii et al. |
| 8,421,483 | B2 | 4/2013 | Klinghult et al. |
| 8,570,297 | B2 | 10/2013 | Bulea et al. |
| 8,633,911 | B2 | 1/2014 | Schediwy et al. |
| 8,797,295 | B2 | 8/2014 | Bernstein et al. |
| 2006/0001654 | A1* | 1/2006 | Smits ............ G06F 3/03542 345/176 |
| 2006/0279548 | A1 | 12/2006 | Geaghan |
| 2006/0284858 | A1 | 12/2006 | Rekimoto |
| 2008/0024454 | A1 | 1/2008 | Everest |
| 2009/0046110 | A1 | 2/2009 | Sadler et al. |
| 2009/0160793 | A1 | 6/2009 | Rekimoto |
| 2009/0237374 | A1 | 9/2009 | Li et al. |
| 2011/0050588 | A1 | 3/2011 | Li et al. |

(Continued)

*Primary Examiner* — Ryan A Lubit
(74) *Attorney, Agent, or Firm* — Osha Liang LLP

(57) ABSTRACT

A method for controlling a user interface using an indirect input device includes determining a first touchdown location of an input object, determining a first subsequent location of the input object, calculating a first direction and a first distance between the first touchdown location and the first subsequent location, and moving a cursor representation on a display in a second direction and at a velocity. The method further includes detecting a touchdown event of at least two input objects, determining a second touchdown location of the at least two input objects, determining a second subsequent location of the at least two input objects, calculating a third direction and a second distance from the second touchdown location and the second subsequent location, and modulating a user interface action in a fourth direction at a magnitude.

24 Claims, 6 Drawing Sheets

(56) References Cited

U.S. PATENT DOCUMENTS

| | | | |
|---|---|---|---|
| 2011/0205182 A1 | 8/2011 | Miyazawa et al. | |
| 2012/0007805 A1* | 1/2012 | Kim | G06F 3/0416 345/159 |
| 2012/0038583 A1 | 2/2012 | Westhues et al. | |
| 2013/0055150 A1* | 2/2013 | Galor | G09G 5/34 715/784 |
| 2013/0086530 A1* | 4/2013 | Gandhi | G06F 3/0488 715/862 |
| 2014/0185834 A1* | 7/2014 | Fromel | G06F 3/0488 381/109 |
| 2014/0238152 A1 | 8/2014 | Kallassi et al. | |
| 2015/0227220 A1* | 8/2015 | Tabone | G06F 3/03547 345/173 |
| 2016/0188181 A1* | 6/2016 | Smith | G06F 3/048 715/765 |

* cited by examiner

METHOD, SYSTEM, AND DEVICE FOR CONTROLLING A CURSOR OR USER INTERFACE ACTION AS A FUNCTION OF TOUCH AND FORCE INPUT

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, one or more embodiments relate to a method for controlling a user interface using an indirect input device. The method includes determining a first touchdown location of an input object, determining a first subsequent location of the input object, calculating a first direction and a first distance between the first touchdown location and the first subsequent location, and moving a cursor representation on a display in a second direction and at a velocity. The second direction is defined by the first direction, the velocity based on the first distance and a first force imparted by the input object on an input surface. The method further includes detecting a touchdown event of at least two input objects, determining a second touchdown location of the at least two input objects, determining a second subsequent location of the at least two input objects, calculating a third direction and a second distance from the second touchdown location and the second subsequent location, and modulating a user interface action in a fourth direction at a magnitude. The fourth direction is based on the third direction, and the magnitude is based on the second distance and a second force imparted onto the input surface.

In general, in one aspect, one or more embodiments relate to a processing system for controlling a user interface using an indirect input device. The processing system includes a sensor module including sensor circuitry coupled to sensor electrodes, the sensor module configured to transmit transmitter signals and receive resulting signals with at least a portion of the sensor electrodes. The processing system further includes a determination module operatively connected to the sensor electrodes and configured to determine a first touchdown location of an input object, determine a first subsequent location of the input object, calculate a first direction and a first distance between the first touchdown location and the first subsequent location, and move a cursor representation on a display in a second direction and at a velocity. The second direction is defined by the first direction, and the velocity is based on the first distance and a first force imparted by the input object on the input surface. The determination module is further configured to detect a touchdown event of at least two input objects, determine a second touchdown location of the at least two input objects, determine a second subsequent location of the at least two input objects, calculate a third direction and a second distance from the second touchdown location and the second subsequent location, and modulate a user interface action in a fourth direction at a magnitude. The fourth direction is based on the third direction. The magnitude is based on the second distance and a second force imparted onto the input surface.

In general, in one aspect, one or more embodiments relate to an indirect input device including sensor electrodes configured to generate sensing signals, and a processing system connected to the sensor electrodes. The processing system configured to determine a first touchdown location of an input object, determine a first subsequent location of the input object, calculate a first direction and a first distance between the first touchdown location and the first subsequent location, and move a cursor representation on a display in a second direction and at a velocity. The second direction is defined by the first direction, and the velocity is based on the first distance and a first force imparted by the input object on an input surface. The processing system is further configured to detect a touchdown event of at least two input objects, determine a second touchdown location of the at least two input objects, determine a second subsequent location of the at least two input objects, calculate a third direction and a second distance from the second touchdown location and the second subsequent location, and modulate a user interface action in a fourth direction at a magnitude. The fourth direction is based on the third direction, and the magnitude is based on the second distance and a second force imparted onto the input surface.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements.

DETAILED DESCRIPTION

Figure 1:
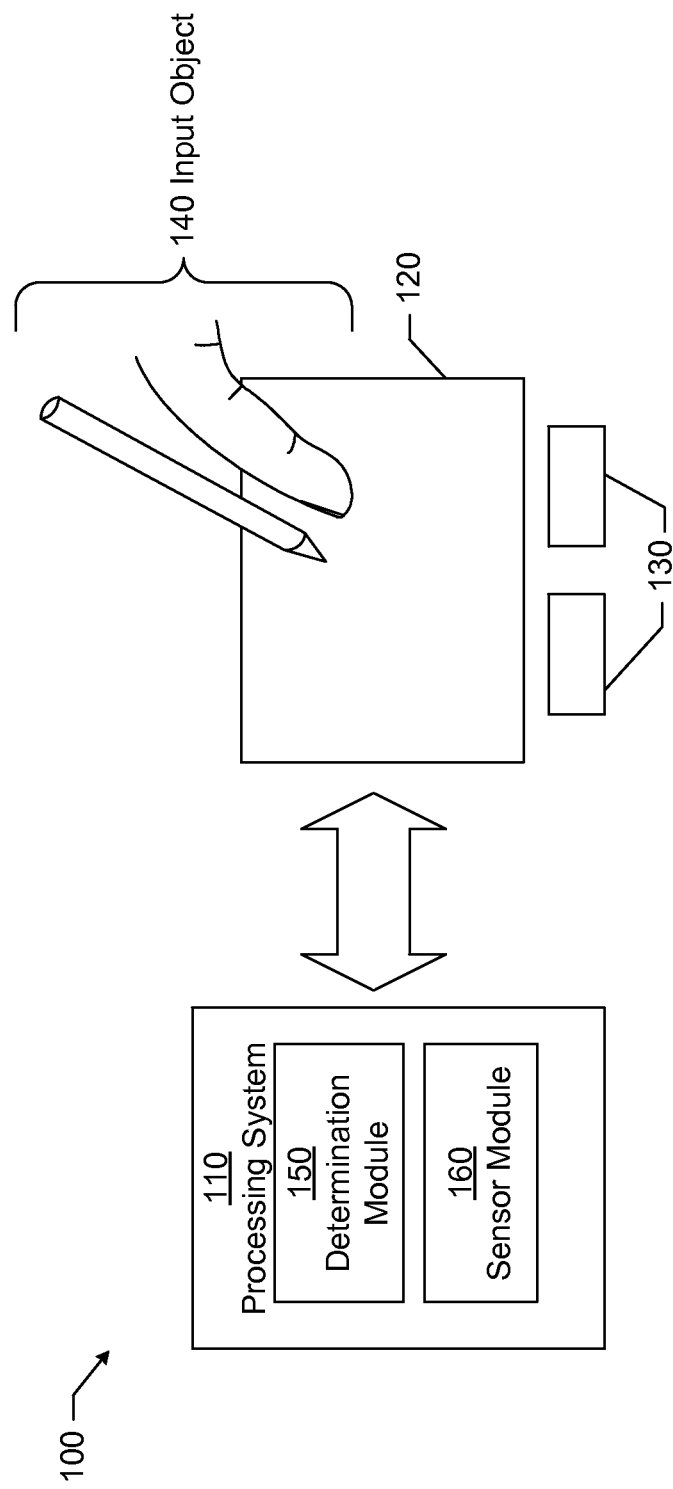
FIGS. 1 and 2 are block diagrams of an example system in accordance with one or more embodiments of the invention.

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability. One or more embodiments of the invention are directed to using force and position to modulate user interface actions. In particular, one or more embodiments correspond to a device and method for interpreting isometric and isotonic input on the same input device. For isometric input, one or more embodiments may mimic the functionality provided by a pointing stick or isometric joystick, while, for isotonic input, one or more embodiments allow for standard movement. Thus, one or more embodiments of the invention may allow for isometric and isotonic input on a touchpad or touchscreen.

A user interface action is any information that is transmitted or received in a user interface. Modulation of the user interface action is to change the information transmitted or received over time.

In one or more embodiments of the invention, the user interface action is output from the user interface. For example, the user interface action may be displayed, transmitted as audio output, and/or otherwise transmitted as output. By way of a more concrete example, modulation of the user interface action may be movement of a cursor, scrolling of a document, selection of displayed items, fast forwarding of an audio file, or other output.

In other embodiments the user interface action is information provided to an application as input from the user. In such a scenario, modulation of the user interface action may be an amount requested to change the user interface. For example, the user interface action may be information requesting to open one or more applications or windows. Modulation of the user interface action may be the indicator of the number of windows or applications to open.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2:
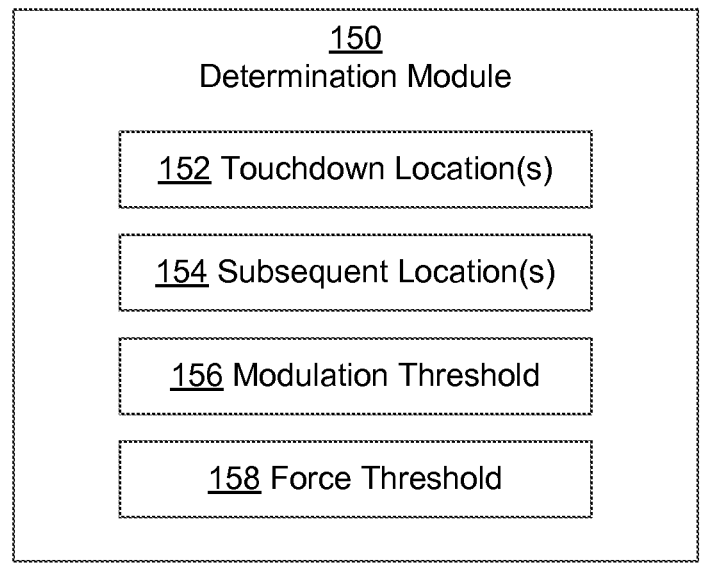

FIG. 2 shows a schematic diagram of information that may be maintained by the determination module in accordance with one or more embodiments of the invention. As shown in FIG. 2, the determination module (150) may include functionality to maintain one or more touchdown locations (152), one or more subsequent locations (154), a modulation threshold (156), and a force threshold (158). In particular, the determination module (150) may include functionality to determine touchdown locations (152) and subsequent locations (154) and use the touchdown locations (152) and subsequent locations (154) for subsequent operations.

In one or more embodiments of the invention, a touchdown location is a detected position that is identified as the position of the detected landing event of the input object. In other words, a landing event is an event in which the input object first contacts the input surface of the sensing region. A landing event may be the first contact of the input object after the input device is powered on, or may be a contact subsequent to the first contact after the input device is powered on, whereby the input object is not present on the input surface immediately prior to the subsequent contact with the input surface. For example, a landing event may correspond to each tap when a user is tapping the input surface, the start of a swipe operation when the input object is not present immediately prior to the start of the swipe operation, or another first contact with the input surface. Thus, the touchdown location is the position of the input object on the sensing region at the time of the landing event in accordance with one or more embodiments of the invention.

In one or more embodiments of the invention, the determination module may maintain multiple touchdown locations. In one or more embodiments of the invention, each of the multiple touchdown locations maintained at the same time by the determination module may correspond to the same and/or different input objects. Further, each of the multiple touchdown locations may correspond to individual and distinct landing events. In the case in which the landing events correspond to multiple input objects, the landing events may be at the same time or at different times. For example, a first input object and second input object may contact the sensing region at substantially the same time. By way of another example, a first input object may contact the sensing region and, after the first input object contacts and prior to the removal of the first input object, a second input object may contact the input surface.

In one or more embodiments of the invention, a subsequent locations (154) is a detected position of an input object after the landing event. In other words, immediately prior to the time in which the input object is at the subsequent location, the input object is detected as being in contact with the input surface. Thus, the subsequent location does not correspond to a landing event, but rather to a time after the landing event. In one or more embodiments of the invention, the subsequent location may be a same position as the touchdown position or a different position.

Continuing with FIG. 2, the modulation threshold (156) is a threshold value defining when to start triggering a modulation of a user interface action. The modulation threshold may be set such that unintentional input from the user does not cause modulation of the user interface action. In one or more embodiments of the invention, the modulation threshold is a minimum distance value, a minimum force value, a function of distance and force, or another threshold. In other words, the minimum distance may be the minimum distance between the touchdown location and a subsequent location of an input object. The minimum force value may be the minimum amount of force detected on the input surface. The function may be, for example, defined to trigger modulation with a decreased distance when the force is greater, with a decreased force when the distance is larger, and an increased distance and force.

The force threshold (158) is a value defining a minimum amount of force to trigger modulation of the user interface action based on force. In other words, the force threshold (158) defines when to use force as a factor in the amount of modulation of the user interface action. The force threshold (158) may alternatively or additionally include a value for when to stop using force as a factor in the amount of modulation of the user interface action. The value for triggering the modulation based on force and the value to stop triggering modulation based on force may be the same or different values.

In one or more embodiments of the invention, the modulation threshold (156) and the force threshold (158) may be configurable and may change. In other embodiments, the modulation threshold (156) and the force threshold (158) may remain constant.

Although FIG. 2 only shows a couple of thresholds, additional or alternative thresholds may exist without departing from the scope of the invention. For example, a distance threshold may exist, whereby the distance threshold specifies an amount of distance between the touchdown location and the subsequent location before force is no longer used as a factor in modulating the user interface action. In one or more embodiments, the distance threshold is set based on a size of the finger. In other words, a rolling of the finger with force may cause modulating of the user interface action with force used as a factor in the amount of modulation, whereas a sliding of the finger causes a stop in using the force as a factor in the amount of modulation.

Figure 3:
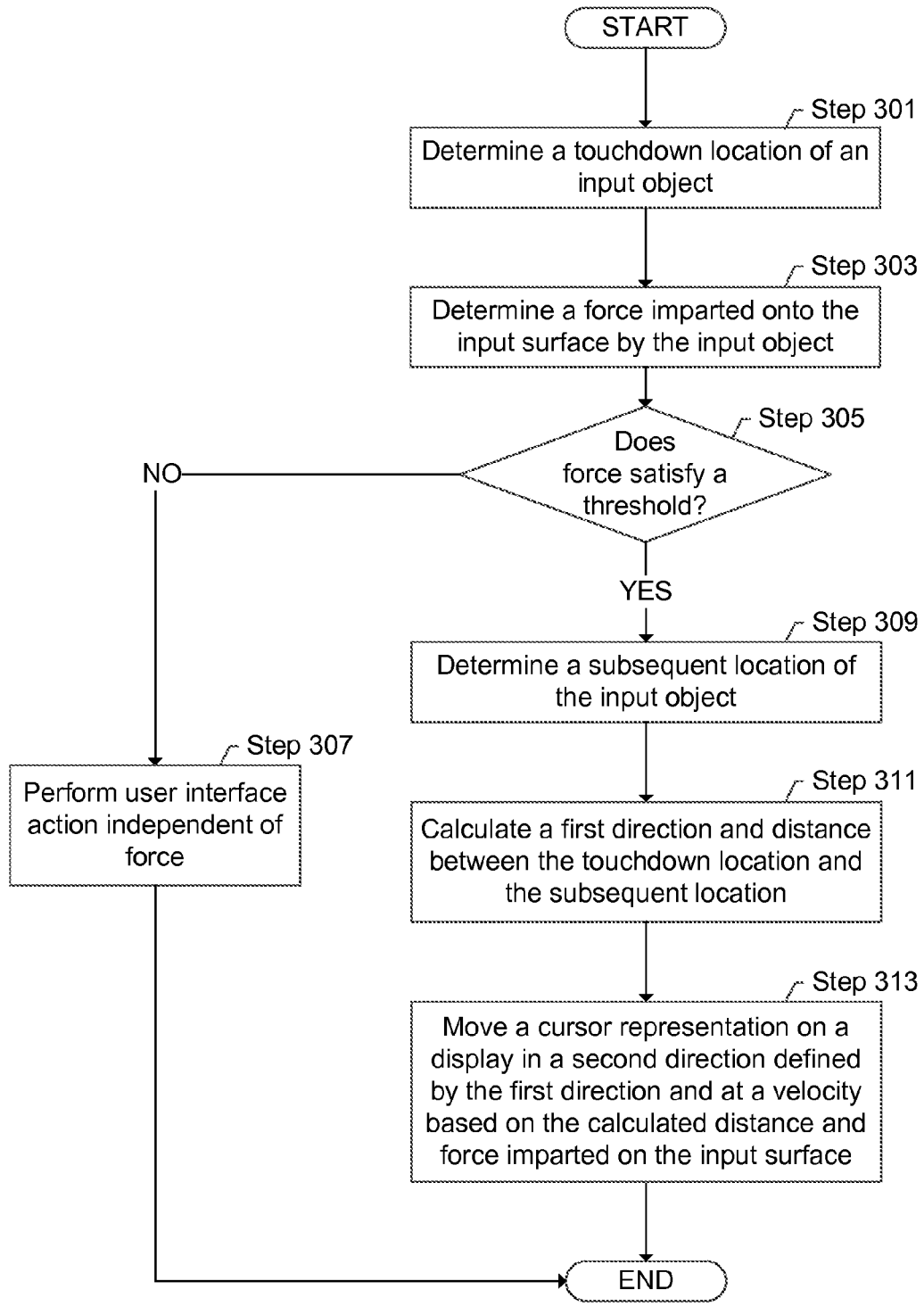
FIGS. 3 and 4 are flowcharts in accordance with one or more embodiments of the invention.
Figure 4:
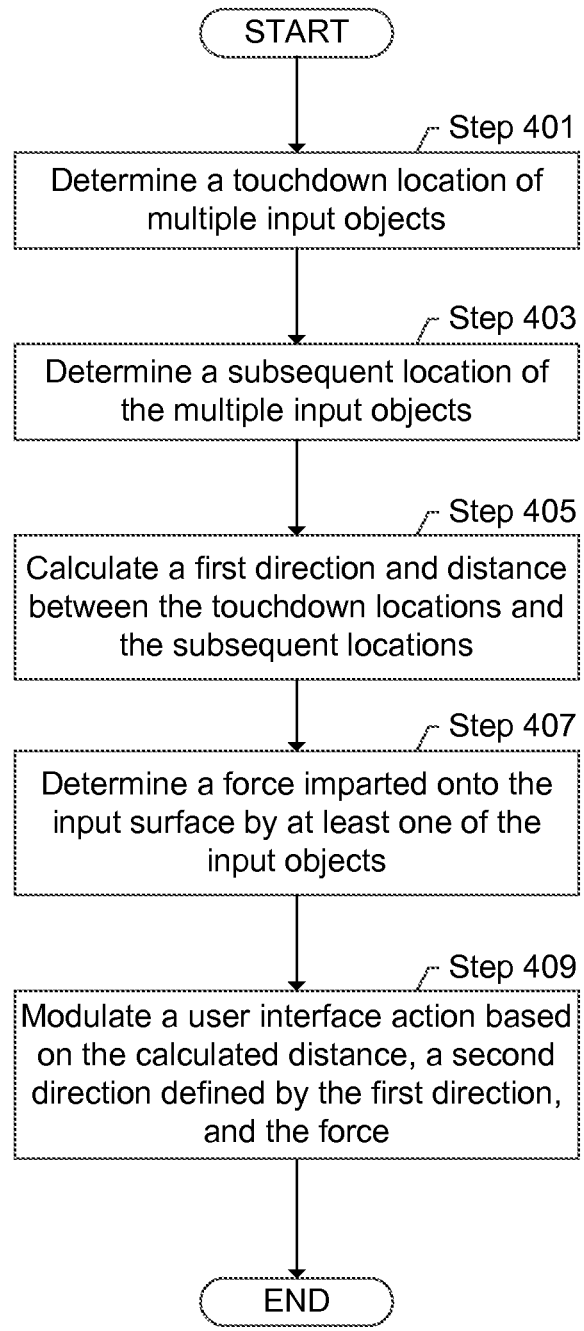

FIGS. 3 and 4 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively.

FIG. 3 shows a flowchart for modulating a user interface action using a single input object. In Step 301, a touchdown location of an input object is determined in accordance with one or more embodiments of the invention. Various techniques may be used to determine the touchdown location of the input object. For example, the sensor module may transmit transmitter signals and receive resulting signals with at least a portion of sensor electrodes. Measurements may be acquired from the resulting signals. The determination module may perform additional processing, such as subtracting the baseline to account for noise, and applying a detection threshold to the processed measurements. The determination module may determine the touchdown location based on the measurements satisfying the detection thresholds. In one or more embodiments of the invention, the determination module may detect that the location corresponds to a landing event based on not detecting the input object in the sensing region in an immediate prior frame. Other techniques for determining the touchdown location may be used without departing from the scope of the invention.

In Step 303, the force imparted onto the input surface by the input object is determined in accordance with one or more embodiments of the invention. In one or more embodiments of the invention, the force may be determined, for example using force sensors. In particular, the input device may include force sensor electrodes that are configured to receive resulting signals indicative of an amount of force applied by the input object. Based on the values of the resulting signals at the time of the subsequent location being detected, the force imparted by the input object onto the input surface is determined.

In Step 305, a determination is made whether the force satisfies a threshold in accordance with one or more embodiments of the invention. In some embodiments, the force satisfies the threshold when the force is at least greater than the threshold. If the force does not satisfy the threshold, in one or more embodiments of the invention, the flow proceeds to Step 307.

In Step 307, a user interface action may be performed independent of force in accordance with one or more embodiments of the invention. For example, normal pointing may be performed, such as the cursor moving in a speed dependent on only the touch, or gesture recognition may be performed. Other user interface actions may be performed when the force does not satisfy a threshold without departing from the scope of the invention.

Returning to Step 305, if the force satisfies the threshold, the flow proceeds to Step 309. In Step 309, a subsequent location of the input object is determined in accordance with one or more embodiments of the invention. In one or more embodiments of the invention, the subsequent location may be determined using a similar technique to determining the touchdown location. In other words, for a subsequent frame of sensing, the sensor electrodes may be used to acquire measurements of the sensing region. Based on the acquired measurements, a similar technique as described above may be used to identify the location. Because in an immediate prior frame the input object is detected, the location may be determined to be a subsequent location. Other techniques may be used to determine the subsequent location of the input object.

In Step 311, a first direction and a distance between the touchdown location and the subsequent location is calculated in accordance with one or more embodiments of the invention. In one or more embodiments of the invention, the first direction is the direction that the input object traveled from the touchdown location to the subsequent location. The first direction may be calculated, for example, based on the horizontal and vertical axis coordinates of the touchdown location and the subsequent location. The first direction may be calculated as an angular offset from a referential or pre-defined direction. The distance may be calculated using standard distance calculations such as using the Pythagorean theorem and the coordinates of the touchdown location and the subsequent location.

In Step 313, a cursor representation on a display is moved in a second direction defined by the first direction and at a velocity based on the calculated distance and force imparted on the input surface in accordance with one or more embodiments of the invention. In one or more embodiments of the invention, a mapping exists between directions in the display output and the input surface. For example, if the input device is a substantially horizontal touchpad and the display is the substantially vertical display, the mapping may be that the direction away from the user corresponds to up on the display and a direction toward the user corresponds to down on the display. The mapping may be between a referential direction in the display and a referential direction on the touchpad. In such a scenario, an angular offset from the referential direction on the touchpad is mapped to the same angular offset from the referential direction on the display. Any mapping may be used without departing from the scope of the invention. Further, although the example is described with respect to touchpads and separate displays, one or more embodiments may be used with a touchscreen or other input device.

Continuing with the discussion of Step 313, calculating the velocity may proceed as follows. First, a determination may be made whether and which thresholds are satisfied by the distance and force determined in Steps 303 and 311. Based on which thresholds are satisfied, the cursor representation is moved. For example, if the modulation threshold is not satisfied by the distance and/or force, then the method flow may proceed to end without moving the cursor representation on the display. Specifically, any movement or modulation of the user interface action when the modulation threshold is not satisfied may be suppressed. If the modulation threshold is satisfied, a determination may be made whether the distance threshold to not use force is satisfied. In other words, a determination may be made whether the distance traveled by the input object satisfies the distance threshold to indicate that the cursor representation should be moved independent of force. In such a scenario, the velocity of movement may match, for example, the velocity in which the input object traveled the distance.

If the modulation threshold is satisfied, and the distance threshold is not satisfied, then a determination is made whether a first force threshold is satisfied to use force in calculating velocity. If the first force threshold is not satisfied, then distance may be used without force to calculate velocity. In other words, a direct function that maps distance to velocity may be used. Thus, a greater distance may be equivalent to a greater velocity. In one or more embodiments of the invention, the distance is directly proportional in the function to the velocity.

If the first force threshold is satisfied, the force may be used for velocity. The force may be used in addition to or as an alternative to distance. In other words, velocity may be changed as a monotonically increasing function of force. If used as an alternative to distance, a direct function may map the force to the velocity whereby the force is proportional to velocity. If used in addition to distance, the function may map distance and force to the velocity, whereby distance and force are in a direct relationship with velocity. Further, force may cause an additive effect to velocity, whereby an increase in force has a proportional increase in velocity. As another example, the force may be mapped to acceleration of the movement of the cursor representation.

In one or more embodiments of the invention, the cursor representation is moved in the second direction at the defined velocity. In one or more embodiments of the invention, once the input object is in motion, a determination may be made whether the second force threshold is satisfied to stop using the force to define the velocity. If the second force threshold is satisfied, then the force is no longer used and the cursor representation may visually slow down or stop accelerating. Similarly, when the modulation threshold is no longer satisfied, movement of the cursor representation may be stopped or otherwise suppressed. For example, the representation of the cursor is a function of the amount of force, the touchdown location and the subsequent location and the force exceeding the second threshold results in deceleration of the cursor representation.

If the input object moves after the subsequent location, Steps 303-313 may be repeated for new position of the input object. In repeating Steps 303-313, the subsequent location is the current subsequent location (i.e., position to which the input object moved). The touchdown location referred to in Step 309 may be the actual touchdown location corresponding to the landing event (i.e., not change). Alternatively, the touchdown location referred to in Step 309 may be an antecedent location to the current subsequent location. In other words, Step 309 may be calculating a first direction and distance between the antecedent location and the current subsequent location, whereby the antecedent location is a prior iteration's subsequent location.

In one or more embodiments of the invention, when the input object is detected as being absent from the sensing region, movement of the cursor representation may stop. In other embodiments, movement of the cursor representation may monotonically decrease so as to appear that the cursor representation is gliding to a halt.

Although FIG. 3 shows that modulation of the user interface action is movement of a cursor representation on a display, other user interface actions may be modulated based on the first direction, calculated distance, and force imparted onto the input surface.

Further, in some embodiments, movement of the cursor representation may be suppressed based on the current graphical user interface context. For example, when a particular software program is displayed, the movement of the cursor representation may be disabled. Similarly, a menu option in the displayed software application may cause suppression of the movement of the cursor representation.

FIG. 4 shows a flowchart for using multiple input objects to modulate a user interface action. In Step 401, touchdown location of multiple input objects are determined. In Step 403, a subsequent location of each of the multiple input objects is determined in accordance with one or more embodiments of the invention. In one or more embodiments of the invention, each input object may have a distinct and separate touchdown location. Determining the touchdown location and subsequent location for each input object may be performed in a same or similar manner discussed above with respect to Steps 301 and 303 of FIG. 3.

In Step 405, a first direction and distance are calculated between the touchdown location and the subsequent location in accordance with one or more embodiments of the invention. In some embodiments only a single input object is used for the first direction and distance. Any of the input objects may be used as the single input object. In particular, the order in which the input objects are placed may dictate which input object is used. For example, the precedent input object, or input object placed prior in time to other input objects, may be used. In such an example, the direction and distance of the vector between the touchdown location and the subsequent location of the precedent input object may be used. As another example, the antecedent input object, or the input object placed after in time to other input object(s), may be used. In such an example, the direction and distance of the vector between the touchdown location and the subsequent location of the precedent input object may be used. input object placed first in time on the input surface may be used in some embodiments, while in other embodiments the input object placed last is used. Other non-temporal techniques may be used for selecting the input object that is used for the direction and distance.

Continuing with the discussion of Step 405, the locations of the multiple input objects may be used for direction and distance. In particular, a function of the touchdown locations may be calculated to identify a representative touchdown location. Similarly, a function of the subsequent locations may be calculated to identify a representative subsequent location. For example, the functions may be a function for calculating a midpoint or average of the locations to identify the corresponding representative locations. Other functions may be used without departing from the scope of the invention.

Rather than using a single input object or all input objects, a strict subset of input objects may be used. In other words, multiple input objects may be selected and the function applied to the multiple selected input objects.

In Step 407, the force imparted onto the input surface by at least one of the input objects is determined in accordance with one or more embodiments of the invention. Obtaining the force information may be performed in a same or similar manner discussed above with reference to Step 307 of FIG. 3. In one or more embodiments of the invention, force information is independently determined for each input object. In other words, each input object may have a separate and distinct force value that identifies the amount of force the particular input object places on the input surface. In one or more embodiments of the invention, the force information for one of the input objects, a subset of input objects, or all input objects may be used.

In Step 409, a user interface action is modulated based on the calculated distance, the second direction defined by the first direction, and the force in accordance with one or more embodiments of the invention. In one or more embodiments of the invention, the relative direction of the input objects with respect to each other may determine the type of user interface action. Calculating the second direction defined by the first direction may be performed in a same or similar manner discussed above with reference to Step 309 of FIG. 3. One or more thresholds may be applied as discussed above with reference to FIG. 3 to define how to modulate the user interface action, and stop modulating the user interface action.

Further, in Step 409, if force from multiple input objects are used, the input object with the greater amount of force may be selected for modulating the user interface action. Alternatively, the total amount of force or another function of the force may be used.

In one or more embodiments of the invention, the force may define the degree to which the user interface action is modulated. For example, consider the scenario in which the user interface action is scrolling or panning. The direction of the scrolling or panning may be defined by the touchdown location and the subsequent location of the input objects, while the speed at which the scrolling or panning operations may be defined by a function of the force of one or more input objects. Thus, a user may merely roll the user's fingers on the input surface with sufficient force to trigger the user interface action to perform a greater amount of scrolling or panning in minimal space. Using this technique, one or more embodiments allow for the user to have a coarse adjustment of the scrolling or panning to quickly and in a small amount of space on the input device get to the desired level of scrolling or position in panning. Then, without removing fingers from sensing region, the user may fine-tune the level of scrolling or position in panning by lessening the amount of force below the force threshold and using normal scrolling or panning operations.

By way of a more concrete example, consider a zoom operation in which two input objects are pulled closer together or farther out. The directions between the touchdown location and subsequent location as being substantially toward each other or away from each other may designate that the operation is a zoom operation and whether the zoom is to zoom in or zoom out. The force may be used as an accelerant to the zoom. For example, the force of one or both input objects may increase the amount of zoom at a constant rate or by level. In the level example, if the user is viewing a paragraph level and starts zoom operation with a greater force, the user may jump to viewing the page.

Although not expressly shown in FIG. 4, the touchdown location and the subsequent location may be for different input objects. In other words, a first input object may correspond to the touchdown location, a second interface object may correspond to the subsequent location. Force may then be individually determined for each input object. In such a scenario, the distance between the touchdown location and the subsequent location may correspond to speed, while the direction may be a function of force and the direction between touchdown location and the subsequent location. In other words, if the first input object is placed with the greater force, then the direction is toward the first input object from the second input object. In contrast, if the second input object has greater force, then the direction is reversed, namely, toward the second input object and away from the first input object. As an addition or alternative to distance between the locations, force may be used for speed, similar to discussed above with reference to FIG. 3.

By way of a more concrete example, consider a user that places a first finger on the input surface and a second finger on the input surface to scroll in the user interface. The touchdown location is the first finger, and the subsequent location is the second finger. In the example, if the user puts more force on the first finger, then the direction is defined by the vector from the second finger toward the first finger. Conversely, if the user puts more force on the second finger, the direction is defined by the vector from the first finger to the second finger. The speed may be the distance between the fingers and/or the amount of the force. In the example, the modulated user interface action may be scrolling. In one or more embodiments of the invention, rather than using the greater force for the direction, the least force may be used for the direction without departing from the scope of the invention.

In one or more embodiments of the invention, when one or more input objects is detected as being absent from the sensing region, the user interface action may cease. In some embodiments, the user interface action ceases when the force is below a threshold. In one or more embodiments of the invention, modulating the user interface action may be monotonically decreased when at least one of the input objects is detected as being absent from the input surface or the force is below a threshold. In yet further embodiments, the user interface action may continue to be modulated even after the input object(s) are absent from the sensing region or the force is below a threshold.

Figure 5:
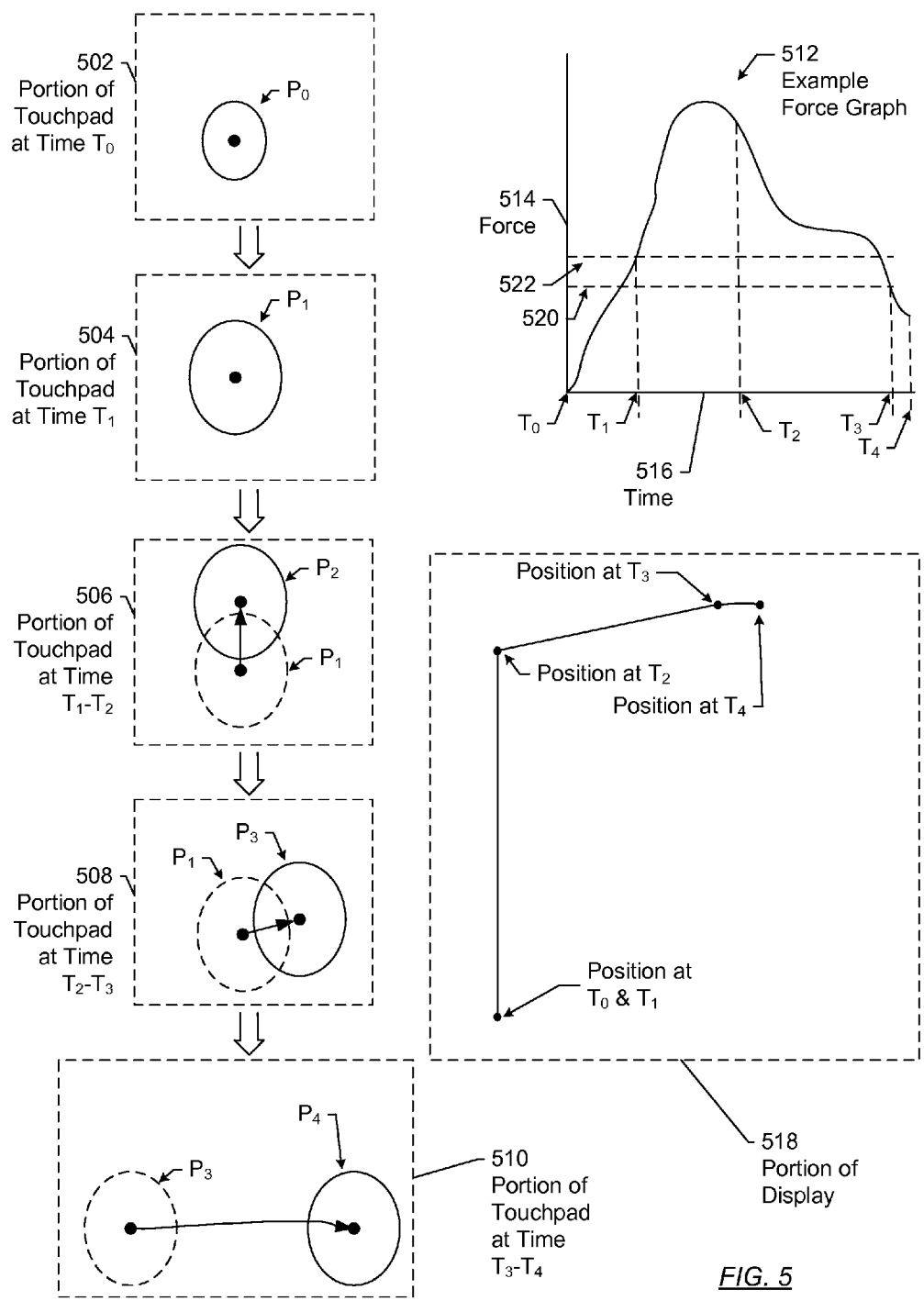
FIGS. 5 and 6 show examples in accordance with one or more embodiments of the invention.

FIG. 5 shows an example in accordance with one or more embodiments of the invention. The example shown in FIG. 5 is for example purposes only and not intended to limit the scope of the invention. The example shown in FIG. 5 illustrates using distance and force to move a cursor representation on a display. For the purposes of the example, consider the scenario in which the input device is a touchpad and the output is a separate display. FIG. 5 shows a series of diagrams of a portion of the touchpad (502-510) at various points in time. The portions shown in diagrams (502-508) are the same portion to each other.

FIG. 5 also shows an example force graph (512) that maps force (514) to time (516). In other words, the example force graph (512) shows the input of the user by the force of the finger shown in the diagrams of (502-510). Additionally, FIG. 5 shows a portion of the display (518) that may result from the input shown in the touchpads and the example force graph. The line in the portion of the display corresponds to the path of the cursor representation.

Throughout FIG. 5, the letter "T" refers to time. Each T having an identical subscript refers to the same point in time. Increasing subscripts correspond to later moments in time. Thus, five moments in time are shown in FIG. 5 (i.e., $T_0$, $T_1$, $T_2$, $T_3$, and $T_4$). Similarly, "P" refers to a position on the input surface of the touchpad. Multiple "P" having the same subscript correspond to the same position on the input surface of the touchpad.

Continuing with the example, as shown in the portion of the touchpad at time $T_0$ (502) and example force graph (512) at $T_0$, a finger is lightly placed on the input surface. As shown in the portion of the touchpad at time $T_1$ (504) and example force graph (512) at $T_1$, a finger is pressed harder onto the input surface. However, because there is no displacement in the finger and the force remains below the force threshold (522), the portion of the display (518) does not shown any change in position of the input object between time $T_0$ and time $T_1$.

Between time $T_1$ and time $T_2$, the user rolls the user finger in a forward direction as shown in the portion of the touchpad (506) and simultaneously steadily increases the force on the finger past the force threshold as shown in the example force graph (512). Thus, movement of the cursor representation proceeds upwards at a relatively fast and increasing rate as a function of force as shown in the portion of display (518) in accordance with one or more embodiments of the invention. The user, as shown in example force graph (512) may start to slow the speed of the movement of the cursor representation by decreasing the amount of force applied. In other words, the velocity of the cursor representation may decrease as the force is decreased.

Between time $T_2$ and time $T_3$, the user rolls the user finger in a substantially right direction as shown in the portion of the touchpad (508) and continues to steadily decrease the force on the finger as shown in example graph (512). In other words, the user starts to tune the cursor representation to the desired position. Thus, movement of the cursor representation proceeds in a substantially right direction, but at a decreasing velocity as defined by the example force graph (512) as shown in the portion of the display (518).

At time $T_3$, the amount of force drops below the second force threshold as shown in the example force graph (512). However, the user moves their finger a greater distance rather than rolling their finger as shown in the portion of the touchpad (510) between time $T_3$ and time $T_4$. The change may correspond to the user desiring to fine tune the position of the cursor representation. Thus, as shown in the example portion of the display (518), although the finger moved a greater distance than previously on the touchpad, the cursor representation moved only a shorter and much less distance on the portion of the display (518). In other words, the force is no longer used to modulate the user interface action.

In the shown example, the touchdown location of the input object is continually used to modulate the movement of the cursor representation, until the force falls below the second force threshold. Then, immediately prior locations of the input object are used for determining the direction to move the input object. Thus, rolling the finger and applying force may be used to rapidly move the cursor representation as defined by the direction of the roll, while a greater distance and less force may be used to fine tune the position of the cursor representation on the display. By having the ability to perform isometric and isotonic input via the input object, the touchpad size may be decreased. In particular, one or more embodiments allow for using a smaller touchpad while not having users run out of room when submitting input.

Figure 6:
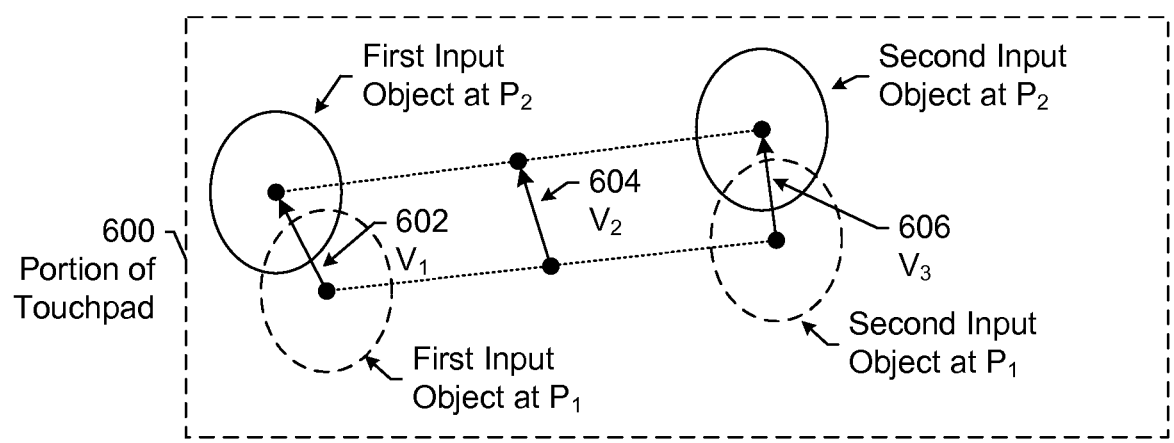

FIG. 6 shows another example in accordance with one or more embodiments of the invention. In particular, FIG. 6 provides an example of having multiple input objects and performing the modulation based on the multiple input objects. FIG. 6 shows a portion of a touchpad (600). For the purposes of the example shown in FIG. 6, consider the scenario in which two input objects exist, a first input object and a second input object. $P_1$ corresponds to the touchdown location of the corresponding input object and $P_2$ corresponds to the subsequent location of the corresponding input object. As shown in the example, portion of the touchpad, when the first input object and the second input object each change to the corresponding subsequent position $P_2$, three vectors (i.e., $V_1$ (602), $V_2$ (604), and $V_3$ (606)) are defined. Vectors $V_1$ (602) and $V_3$ (606) correspond to the first input object and second input object locations, respectively, while vector $V_2$ (604) corresponds to the midpoint location between the touchdown locations and the subsequent locations. Any of the vectors may be used to modulate the user interface action. The vector used may be determined from the configuration of the system in accordance with one or more embodiments of the invention.

The example shown in FIG. 6 may be used for panning purposes. In particular, similar to FIG. 5, by rolling a user's fingers and providing a greater amount of force, the user may have high modulation of the user interface action (e.g., faster panning) without using much valuable touchpad space. The user may fine tune the panning by decreasing the force to below the force threshold and moving the fingers as normal (not shown).

The examples shown in FIGS. 5 and 6 are for example purposes only. Other configurations of the system, input and resulting output may change without departing from the scope of the invention. Moreover, the various embodiments and examples discussed above may be combined into new embodiments and examples without departing from the scope of the invention. Thus, any viable combination of the embodiments discussed above may be used without departing from the scope of the invention.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Accordingly, the scope of the invention should be limited only by the attached claims.

What is claimed is:

1. A method for controlling a user interface using an indirect input device, the method comprising:
   determining a first touchdown location of an input object;
   determining a first subsequent location of the input object;
   calculating a first direction and a first distance between the first touchdown location and the first subsequent location;
   moving a cursor representation on a display in a second direction and at a first velocity, the second direction defined by the first direction, the first velocity based on the first distance and a first force imparted by the input object on an input surface;
   determining a second subsequent location of the input object;
   calculating a third direction and a second distance between the first subsequent location and the second subsequent location;
   determining that a second force imparted by the input object on the input surface at the second subsequent location is below a force threshold, the second force being less than the first force;
   moving the cursor representation on the display in a fourth direction and at a second velocity when the second force is below the force threshold, the fourth direction defined by the third direction, wherein the second velocity is based only on the second distance and while ignoring a magnitude of the second force;
   detecting a touchdown event of at least two input objects;
   determining a second touchdown location of the at least two input objects;
   determining a third subsequent location of the at least two input objects;
   calculating a fifth direction and a third distance from the second touchdown location and the third subsequent location; and
   modulating a user interface action in a sixth direction at a magnitude of the user interface action, wherein the sixth direction is based on the fifth direction, and wherein the magnitude of the user interface action is based on the third distance and a third force imparted onto the input surface.

2. The method of claim 1, wherein the velocity being based on the first force comprises:

determining whether the first force is greater than the force threshold, and changing the velocity according to a monotonically increasing function of the first force when the first force is greater than the force threshold.

3. The method of claim 1, further comprising:

suppressing moving the cursor representation until the first distance is greater than a modulation threshold.

4. The method of claim 1, further comprising:

suppressing moving the cursor representation until the first force is greater than a modulation threshold.

5. The method of claim 1, further comprising:

suppressing moving the cursor representation based on a current graphical user interface context.

6. The method of claim 1, further comprising:

stopping moving the cursor representation when the input object is absent from the input surface.

7. The method of claim 1, further comprising:

stopping moving the cursor representation when the first force is less than a modulation threshold.

8. The method of claim 1, further comprising:

monotonically decreasing the moving of the cursor representation when the input object is absent from the input surface.

9. The method of claim 1, wherein the user interface action comprises at least one selected from a group consisting of scrolling and zooming.

10. The method of claim 1, further comprising:

ceasing the user interface action when at least one of the at least two input objects is absent from the input surface.

11. The method of claim 1, further comprising:

ceasing the user interface action when the second force is less than a modulation threshold.

12. The method of claim 1, further comprising:

monotonically decreasing the modulating of the user interface action when at least one of the at least two input objects is absent from the input surface.

13. The method of claim 1, further comprising:

monotonically decreasing the modulating of the user interface action when the third force is below a threshold.

14. The method of claim 1, further comprising:

continuing to modulate the user interface action after the at least two input objects are absent from the input surface.

15. A processing system for controlling a user interface using an indirect input device, comprising:

a sensor module comprising sensor circuitry coupled to a plurality of sensor electrodes, the sensor module configured to transmit transmitter signals and receive resulting signals with at least a portion of the plurality of sensor electrodes; and a processing circuitry operatively connected to the plurality of sensor electrodes and configured to:

determine a first touchdown location of an input object, determine a first subsequent location of the input object, calculate a first direction and a first distance between the first touchdown location and the first subsequent location, move a cursor representation on a display in a second direction and at a first velocity, the second direction defined by the first direction, the first velocity based on the first distance and a first force imparted by the input object on the input surface, determine a second subsequent location of the input object;

calculate a third direction and a second distance between the first subsequent location and the second subsequent location;

determine that a second force imparted by the input object on the input surface at the second subsequent location is below a force threshold, the second force being less than the first force;

move the cursor representation on the display in a fourth direction and at a second velocity when the second force is below the force threshold, the fourth direction defined by the third direction, wherein the second velocity is based only on the second distance and while ignoring a magnitude of the second force;

detect a touchdown event of at least two input objects, determine a second touchdown location of the at least two input objects, determine a third subsequent location of the at least two input objects, calculate a fifth direction and a third distance from the second touchdown location and the third subsequent location, and modulate a user interface action in a sixth direction at a magnitude of the user interface action, wherein the sixth direction is based on the fifth direction, and wherein the magnitude of the user interface action is based on the third distance and a third force imparted onto the input surface.

16. The processing system of claim 15, wherein the processing circuitry is further configured to:

individually determining the third force for each input object of the at least two input objects to obtain at least two individually determined forces, wherein modulating the user interface action is based on the at least two individually determined forces.

17. The processing system of claim 15, wherein the velocity being based on the first force comprises:

applying a function to the first force and the first distance to obtain the velocity.

18. The processing system of claim 15, wherein calculating the fifth direction comprises:

determining an antecedent landed input object of the at least two input objects, and calculating a direction of a vector between the second touchdown location of the antecedent landed input object and the third subsequent location of the antecedent landed input object.

19. The processing system of claim 15, wherein calculating the fifth direction is based on the second touchdown location and the third subsequent location of both of the at least two input objects.

20. The processing system of claim 19, wherein calculating the fifth direction comprises calculating an average of the second touchdown location and the third subsequent location of both of the at least two input objects.

21. The processing system of claim 15, wherein calculating the second distance comprises:

determining an antecedent landed input object of the at least two input objects, and determining the third distance between the second touchdown location of the antecedent landed input object and the third subsequent location of the antecedent landed input object.

22. The processing system of claim 15, wherein calculating the third distance is based on the second touchdown location and the third subsequent location of both of the at least two input objects.

23. The processing system of claim 15, wherein calculating the third distance comprises calculating an average of the second touchdown location and the third subsequent location of both of the at least two input objects.

24. An indirect input device comprising:
   a plurality of sensor electrodes configured to generate sensing signals; and
   a processing system connected to the plurality of sensor electrodes and configured to:
      determine a first touchdown location of an input object,
      determine a first subsequent location of the input object,
      calculate a first direction and a first distance between the first touchdown location and the first subsequent location,
      move a cursor representation on a display in a second direction and at a first velocity, the second direction defined by the first direction, the first velocity based on the first distance and a first force imparted by the input object on an input surface,
      determine a second subsequent location of the input object;
      calculate a third direction and a second distance between the first subsequent location and the second subsequent location;
      determine that a second force imparted by the input object on the input surface at the second subsequent location is below a force threshold, the second force being less than the first force;
      move the cursor representation on the display in a fourth direction and at a second velocity when the second force is below the force threshold, the fourth direction defined by the third direction, wherein the second velocity is based only on the second distance and while ignoring a magnitude of the second force;
      detect a touchdown event of at least two input objects,
      determine a second touchdown location of the at least two input objects,
      determine a third subsequent location of the at least two input objects,
      calculate a fifth direction and a third distance from the second touchdown location and the third subsequent location, and
      modulate a user interface action in a sixth direction at a magnitude of the user interface action, wherein the sixth direction is based on the fifth direction, and wherein the magnitude of the user interface action is based on the third distance and a third force imparted onto the input surface.

* * * * *